United States Patent
Qu et al.

(10) Patent No.: US 10,632,656 B2
(45) Date of Patent: Apr. 28, 2020

(54) BIAXIAL OR TRI-AXIAL ECCENTRIC ROTOR VOLUME PULSED DEFORMATION PLASTICIZING METHOD AND DEVICE

(71) Applicants: South China University of Technology, Guangzhou (CN); Guangzhou Huaxinke Intelligent Manufacturing Technology Co., Ltd., Guangzhou (CN)

(72) Inventors: Jinping Qu, Guangzhou (GD); Zhitao Yang, Guangzhou (CN); Yanhong Feng, Guangzhou (CN); Xiaochun Yin, Guangzhou (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 70 days.

(21) Appl. No.: 15/743,795

(22) PCT Filed: Dec. 13, 2016

(86) PCT No.: PCT/CN2016/109613
§ 371 (c)(1),
(2) Date: Jan. 11, 2018

(87) PCT Pub. No.: WO2017/157061
PCT Pub. Date: Sep. 21, 2017

(65) Prior Publication Data
US 2018/0200937 A1   Jul. 19, 2018

(30) Foreign Application Priority Data

Mar. 16, 2016   (CN) .......................... 2016 1 0150876

(51) Int. Cl.
*B29C 45/62* (2006.01)
*B29C 45/60* (2006.01)
(Continued)

(52) U.S. Cl.
CPC .............. *B29C 45/62* (2013.01); *B29B 7/482* (2013.01); *B29B 7/485* (2013.01); *B29B 7/488* (2013.01);
(Continued)

(58) Field of Classification Search
CPC ....................................................... B29C 45/62
(Continued)

(56) References Cited

U.S. PATENT DOCUMENTS 2,550,226 A * 4/1951 Colombo ................. A01J 17/00
366/85
3,122,356 A * 2/1964 Erdmenger ............. B29C 48/57
366/85
(Continued)

FOREIGN PATENT DOCUMENTS

CN   103056979   4/2013
CN   104002447   8/2014
(Continued)

*Primary Examiner* — David L Sorkin
(74) *Attorney, Agent, or Firm* — The Dobrusin Law Firm, P.C.

(57) ABSTRACT

The present invention discloses a biaxial or tri-axial eccentric rotor volume pulsed deformation plasticizing method and device. The method is characterized in that: the conveying volume of materials formed between two or three engaged eccentric rotors, which are formed by spiral structures and eccentric cylindrical structures connected alternately, and an inner surface of a stator changes periodically along the axial direction and the radial direction of the rotors, achieving the volume pulsed deformation plasticizing and conveying of the materials during engaged rotation of the two or three engaged eccentric rotors. The device's eccentric rotors are all formed by length-varying spiral structures and eccentric cylindrical structures connected alternately; the spiral structures of the eccentric rotors are engaged to each other; the axial positions of eccentric
(Continued)

cylindrical structures of the two or three rotors are the same. The present invention can implement extrusion of polymer materials or implement, in combination with a plunger injection unit, injection molding of polymer materials, and have many features such as desirable mixing and plasticizing effects for materials, a short thermo-mechanical course, low power consumption, and wide adaptability.

6 Claims, 4 Drawing Sheets

(51) Int. Cl.
| | |
|---|---|
| B29C 45/54 | (2006.01) |
| B29B 7/48 | (2006.01) |
| B29C 48/92 | (2019.01) |
| B29C 48/425 | (2019.01) |
| B29C 48/40 | (2019.01) |
| B29C 48/76 | (2019.01) |
| B29C 37/00 | (2006.01) |
| B29C 48/375 | (2019.01) |
| B29C 48/25 | (2019.01) |
| B29B 7/42 | (2006.01) |

(52) U.S. Cl.
CPC ............ *B29B 7/489* (2013.01); *B29C 37/005* (2013.01); *B29C 45/54* (2013.01); *B29C 45/544* (2013.01); *B29C 45/60* (2013.01); *B29C 48/402* (2019.02); *B29C 48/425* (2019.02); *B29C 48/767* (2019.02); *B29C 48/92* (2019.02); *B29B 7/428* (2013.01); *B29C 48/2513* (2019.02); *B29C 48/375* (2019.02)

(58) Field of Classification Search
USPC .................................................. 366/82, 85
See application file for complete search history.

(56) References Cited

U.S. PATENT DOCUMENTS

| | | | | |
|---|---|---|---|---|
| 3,387,826 A | * | 6/1968 | Loomans | .......... B01F 15/00435 366/77 |
| 2004/0090859 A1 | * | 5/2004 | Chszaniecki | ........... F04C 2/084 366/85 |
| 2006/0245294 A1 | * | 11/2006 | Burkhardt | ............... B29B 7/487 366/85 |

FOREIGN PATENT DOCUMENTS

| | | |
|---|---|---|
| CN | 105690688 | 6/2016 |
| CN | 205614958 | 10/2016 |

* cited by examiner

BIAXIAL OR TRI-AXIAL ECCENTRIC ROTOR VOLUME PULSED DEFORMATION PLASTICIZING METHOD AND DEVICE

FIELD OF THE INVENTION

The present invention relates to a polymer material plasticizing method and device, and more particularly to a biaxial or tri-axial eccentric rotor volume pulsed deformation plasticizing method and device for polymer materials.

BACKGROUND OF THE INVENTION

Twin-screw and triple-screw extrusion is an important method in the processing of polymeric materials and, relative to single-screw extrusion, has better mixing, reacting and degassing effects, suitable for processing plastics with poor thermal stability, especially suitable for processing blends. The plasticizing and conveying process of the twin-screw and triple-screw extrusion materials mainly depends on the shear drag of the screw in rotation, and therefore at present the twin-screw and triple-screw processed polymer materials have ubiquitously a long thermo-mechanical course, high processing energy consumption, poor mixing effects, large device structure, strong dependence on materials and other defects. In order to improve the mixing effects of the polymer materials and reduce the energy consumption of the polymer materials during the plasticizing and conveying, some researchers add kneading elements in some parts of the screw so that the local flow field in the plasticizing process is controlled by the elongational rheology. However, the control of this local flow field does not change the mechanism of the materials dominated by the shear rheology in the twin-screw and triple-screw extrusion plasticizing and conveying process.

With continuous emergence of the current new polymer materials such as plant fiber reinforced materials, biodegradable materials, and high performance materials, the requirements for dimensional accuracy, mixed dispersion characteristics, mechanical properties and other indicators of the polymer materials are also getting higher and higher at the same time, and therefore higher requirements are also put forward for the plasticizing device of the polymer materials. The vane plasticizing and conveying method is based on elongational rheology forces the materials to melt, plasticize and mix through the periodic change in the processing volume of the materials, wherein flow and deformation of the materials are mainly controlled by the tensile stress, and the principal velocity gradient is in the same direction as its main flow and deformation, which exhibits the elongational rheological behavior, thus solving the problem that the screw processing machinery plasticizing capacity mainly depends on the external and internal frictions of the materials. Compared with the screw plasticizing and conveying method, the vane plasticizing and conveying method has such advantages as low energy consumption, a short thermo-mechanical course, high adaptability to materials, and good dispersing and mixing effects. However, in the vane plasticizing and conveying process, the polymer conveying channel is non-streamlined, not conducive to plasticization and mixed modification of the processed thermosensitive polymer.

For current problems that all polymer material processing industries faced, it is of great significance for the polymer material processing field to develop a new plasticizing and conveying method and device that can significantly improve the mixed dispersion and plasticizing and mixing effects of the polymer materials, shorten the thermo-mechanical course and reduce the energy consumption, and effectively avoid the thermal degradation of the polymer materials in the processing process.

CONTENTS OF THE INVENTION

Technical Problems

A purpose of the present invention is to provide a biaxial or tri-axial eccentric rotor volume pulsed deformation plasticizing and conveying processing method, so as to solve such problems as a long thermo-mechanical course, non-uniform mixing and plasticizing of the materials, poor mixed dispersion, and high energy consumption experienced in the polymer material molding process.

A further purpose of the present invention is to provide a device to implement the biaxial or tri-axial eccentric rotor volume pulsed deformation plasticizing method.

Technical Solution

The purposes of the present invention are achieved through the following technical solution:

A biaxial or tri-axial eccentric rotor volume pulsed deformation plasticizing method is provided, wherein the conveying volume of materials formed between two or three engaged eccentric rotors, which are formed by spiral structures and eccentric cylindrical structures connected alternately, and an inner surface of a stator changes periodically along the axial direction and the radial direction of the rotors, achieving the volume pulsed deformation plasticizing and conveying of the materials during engaged rotation of the two or three engaged eccentric rotors.

A biaxial or tri-axial eccentric rotor volume pulsed deformation plasticizing device for implementing the above method is provided, mainly composed of a hopper, two or three eccentric rotors, a stator and a drive unit, the eccentric rotors being disposed in the inner cavity of the stator and connected with the drive unit, respectively; the hopper is in communication with the inner cavity of the stator, and the eccentric rotors are all formed by length-varying spiral structures and eccentric cylindrical structures connected alternately; the spiral structures of the eccentric rotors are engaged to each other; and the axial positions of eccentric cylindrical structures of the two or three rotors are the same.

To further achieve the purpose of the present invention, preferably, the axis of the spiral portion of the two or three rotors is the same as the rotation axis of the rotor, and the axis of the eccentric cylinder is eccentric with respect to the rotation axis of the rotor, with the eccentric cylinder in different positions on the same rotor having the same eccentric direction.

Preferably, both the pitch of the spiral structure of the eccentric rotor and the length of the eccentric cylinder are gradually decreased in the axial direction.

Preferably, there are three eccentric rotors, which are a middle eccentric rotor, a right eccentric rotor and a left eccentric rotor, respectively; the middle eccentric rotor, the right eccentric rotor and the left eccentric rotor are arranged in a "-" horizontal arrangement in the inner cavity of the stator; and the spiral structure of the middle eccentric rotor and the spiral structures of the right eccentric rotor and the left eccentric rotor are engaged to each other.

Preferably, there are two eccentric rotors, which are a first eccentric rotor and a second eccentric rotor, respectively, both engaged in the same or different direction in the inner cavity of the stator.

Preferably, the device is mainly composed of a tri-axial eccentric rotor volume pulsed deformation plasticizing and conveying unit and a plunger injection unit, the tri-axial eccentric rotor volume pulsed deformation plasticizing and conveying unit is mainly composed of a hopper, a middle eccentric rotor, a right eccentric rotor, a left eccentric rotor, a stator and a drive unit; the plunger injection unit is mainly composed of a connector, a plunger and a cylinder; the cylinder is connected with the stator through the connector, and the plunger is connected with the cylinder; the middle eccentric rotor, the right eccentric rotor and the left eccentric rotor, respectively connected with the drive unit, are all placed in the inner cavity of the stator; both the pitch of the spiral structure and the length of the eccentric cylinder decrease along the axial direction; and the spiral structure of the middle eccentric rotor and the spiral structures of the right eccentric rotor and the left eccentric rotor are engaged to each other.

The present invention can implement extrusion of polymer materials or implement, in combination with a plunger injection unit, injection molding of polymer materials.

Beneficial Results

With respect to the prior art, the present invention solves such problems as a long thermo-mechanical course, non-uniform mixing and plasticizing of the materials, poor mixed dispersion, and high energy consumption experienced in the polymer material molding process, and has the following advantages compared with the traditional polymer material processing technology and device:

1. The materials undergo cyclical changes in volume in a specific space to complete the plasticizing and conveying process, which is based on domination of the volume pulsed deformation, and has a greatly shortened thermo-mechanical course and reduced plasticizing and conveying energy compared with the traditional screw plasticizing and conveying process based on domination of the shear rheology;

2. the conveying volume of materials formed between two or three engaged eccentric rotors with a special surface structure and an inner surface of a stator changes periodically along the axial direction and the radial direction of the rotors, improving the plasticizing and mixing and mixed dispersion effects of the polymer materials, and having higher adaptability to materials;

3. the plasticizing and conveying process of the materials is continuous with fully positive displacement characteristics, having greatly enhanced extrusion stability and efficiency; and 4. the device is convenient for disassembly and assembly, as well as for application and promotion.

DETAILED DESCRIPTION OF THE EMBODIMENTS

The present invention will be further described below with reference to drawings and examples. However, the claimed range of the present invention is not limited to the scope of the examples.

Example 1

Figure 1:
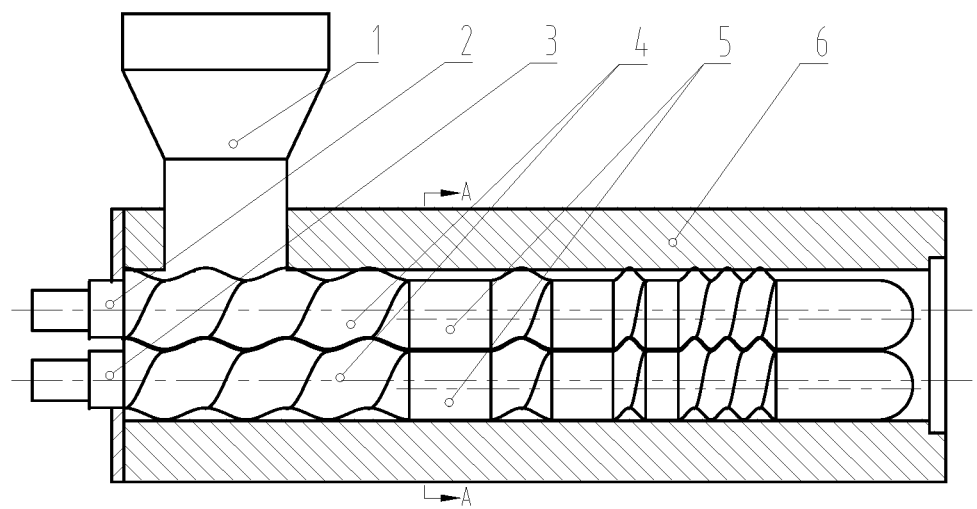
FIG. 1 is a schematic view of the structure of a biaxial eccentric rotor (engaged in the same direction) volume pulsed deformation plasticizing device of Example 1.
Figure 2:
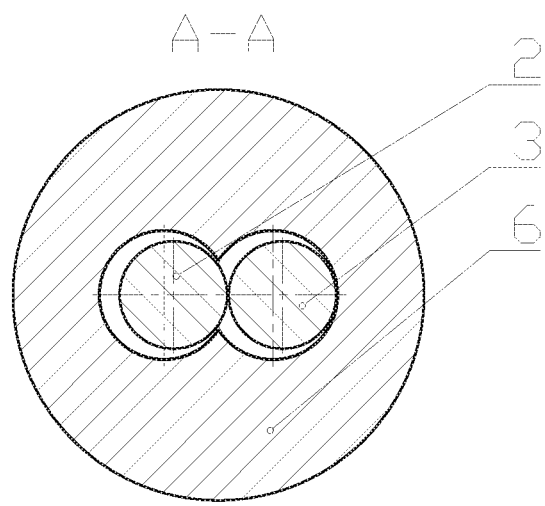
FIG. 2 is a sectional view of FIG. 1 along a line A-A.

As shown in FIGS. 1 and 2, a biaxial eccentric rotor (rotated in the same direction) volume pulsed deformation plasticizing device is mainly composed of a hopper 1, a first eccentric rotor 2, a second eccentric rotor 3, a stator 6 and a drive unit, wherein the first eccentric rotor 2 and the second eccentric rotor 3 are engaged to each other in the inner cavity of the stator 6 and respectively connected with the drive unit, the hopper 1 is in communication with the inner cavity of the stator, and the first eccentric rotor 2 and the second eccentric rotor 3 are rotated in the same direction; the first eccentric rotor 2 and the second eccentric rotor 3 are both formed by a spiral structure 4 and a length-varying eccentric cylindrical structure 5 connected alternately, both the pitch of the spiral structure 4 and the length of the eccentric cylinder 5 decreasing along the axial direction; the spiral structures 4 of the first eccentric rotor 2 and the second eccentric rotor 3 are engaged to each other, and the eccentric cylindrical structures 5 of the first eccentric rotor 2 and the second eccentric rotor 3 are located in the same axial position. The axis of the spiral portion 4 of the first eccentric rotor 2 and the second eccentric rotor 3 is the same as the rotation axis of the rotor, and the axis of the eccentric cylinder 5 is eccentric with respect to the rotation axis of the rotor, with the eccentric cylinder in different positions on the same rotor having the same eccentric direction. When the first eccentric rotor 2 and the second eccentric rotor 3 are rotated in the same direction, the outer surface of the two eccentric rotors 5 and the inner surface of the stator 6 and the top of the spiral rib of the spiral structure 4 form a cavity, whose volume changes periodically along the axial direction and the radial direction of the first eccentric rotor 2 and the second eccentric rotor 3 along with the rolling of the eccentric cylinder 5; when the volume of the cavity is changed from small to large, the materials are introduced; when the volume is changed from large to small, the materials are ground, compacted, degassed, plasticized and molten, and finally discharged from the die under the action of the positive stress and the stator 6 heated externally.

Example 2

Figure 3:
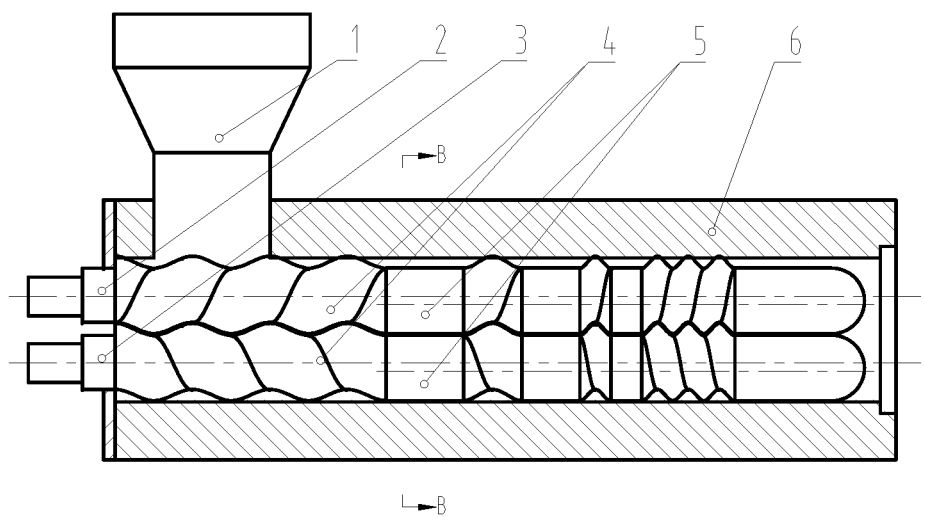
FIG. 3 is a schematic view of the structure of a biaxial eccentric rotor (engaged in the different direction) volume pulsed deformation plasticizing device of Example 2.
Figure 4:
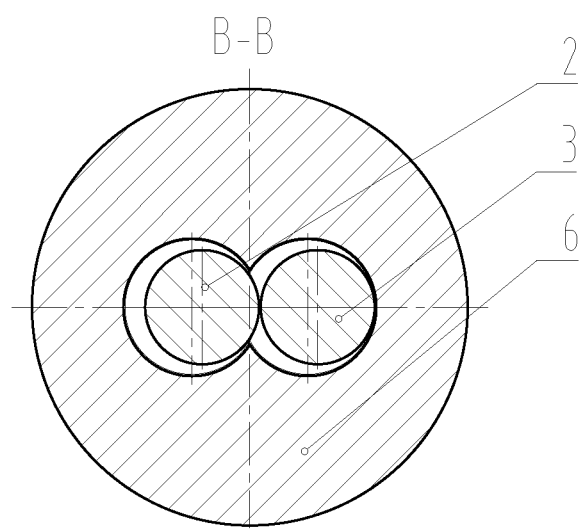
FIG. 4 is a sectional view of FIG. 3 along a line B-B.

As shown in FIGS. 3 and 4, a biaxial eccentric rotor (rotated in the different direction) volume pulsed deformation plasticizing device is mainly composed of a hopper 1, a first eccentric rotor 2, a second eccentric rotor 3, a stator 6 and a drive unit, wherein the first eccentric rotor 2 and the second eccentric rotor 3 are engaged to each other in the inner cavity of the stator 6 and respectively connected with the drive unit, the hopper 1 is in communication with the inner cavity of the stator, and the first eccentric rotor 2 and the second eccentric rotor 3 are both formed by a spiral structure 4 and a length-varying eccentric cylindrical structure 5 connected alternately, both the pitch of the spiral structure 4 and the length of the eccentric cylinder 5 decreasing along the axial direction; the spiral structures 4 of the first eccentric rotor 2 and the second eccentric rotor 3 are engaged to each other, and the eccentric cylindrical structures 5 of the first eccentric rotor 2 and the second eccentric rotor 3 are located in the same axial position. The axis of the spiral portion 4 of the first eccentric rotor 2 and the second eccentric rotor 3 is the same as the rotation axis of the rotor, and the axis of the eccentric cylinder 5 is eccentric with respect to the rotation axis of the rotor, with the eccentric cylinder in different positions on the same rotor having the same eccentric direction. When the first eccentric rotor 2 and the second eccentric rotor 3 are rotated in the different direction, the outer surface of the two eccentric rotors 5 and the inner surface of the stator 6 and the top of the spiral rib of the spiral structure 4 form a cavity, whose volume changes periodically along the axial direction and the radial direction of the first eccentric rotor 2 and the second eccentric rotor 3 along with the rolling of the eccentric cylinder 5; when the volume of the cavity is changed from small to large, the materials are introduced; when the volume is changed from large to small, the materials are ground, compacted, degassed, plasticized and molten, and finally discharged from the die under the action of the positive stress and the stator 6 heated externally.

Example 3

Figure 5:
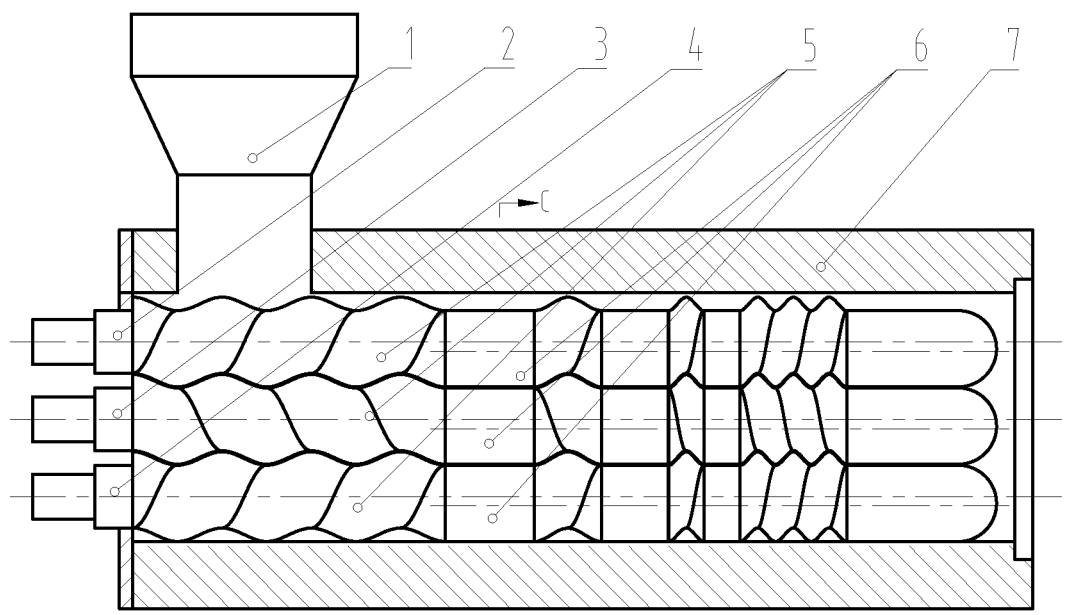
FIG. 5 is a schematic view of the structure of a tri-axial eccentric rotor volume pulsed deformation plasticizing injection device of Example 3.
Figure 6:
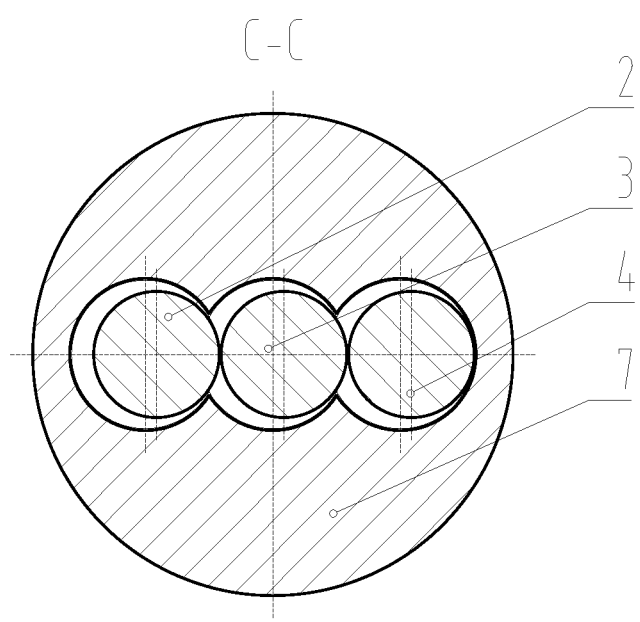
FIG. 6 is a sectional view of FIG. 5 along a line C-C.

As shown in FIGS. 5 and 6, the tri-axial eccentric rotor volume pulsed deformation plasticizing device is mainly composed of a hopper 1, three rotors (a middle eccentric rotor 3, a right eccentric rotor 2 and a left eccentric rotor 4), a stator 7 and a drive unit, wherein the middle eccentric rotor 3, the right eccentric rotor 2 and the left eccentric rotor 4 are arranged in a "-" horizontal arrangement in the inner cavity of the stator 7 and respectively connected with the drive unit, with the hopper 1 in communication with the inner cavity of the stator; the middle eccentric rotor 3, the right eccentric rotor 2 and the left eccentric rotor 4 are all formed by a spiral structure 5 and a length-varying eccentric cylindrical structure 6 connected alternately, both the pitch of the spiral structure 5 and the length of the eccentric cylinder 6 decreasing along the axial direction; the spiral structure 5 of the middle eccentric rotor 3 and the spiral structures 5 of the right eccentric rotor 2 and the left eccentric rotor 4 are engaged to each other, and the eccentric cylindrical structures 6 of the middle eccentric rotor 3, the right eccentric rotor 2 and the left eccentric rotor 4 are all located in the same axial position. The axis of the spiral portion 5 of the middle eccentric rotor 3, the right eccentric rotor 2 and the left eccentric rotor 4 is the same as the rotation axis of the rotor, and the axis of the eccentric cylinder 6 is eccentric with respect to the rotation axis of the rotor, with the eccentric cylinder in different positions on the same rotor having the same eccentric direction. When the middle eccentric rotor 3, the right eccentric rotor 2 and the left eccentric rotor 4 are rotated, the outer surface of the three eccentric rotors 6 and the inner surface of the stator 7 and the top of the spiral rib of the spiral structure 5 form a cavity, whose volume changes periodically along the axial direction and the radial direction of the middle eccentric rotor 3 and the right eccentric rotor 2 and the left eccentric rotor 4 along with the rolling of the eccentric cylinder 6; when the volume of the cavity is changed from small to large, the materials are introduced; when the volume is changed from large to small, the materials are ground, compacted, degassed, plasticized and molten, and finally discharged from the die under the action of the positive stress and the stator 7 heated externally.

Example 4

Figure 7:
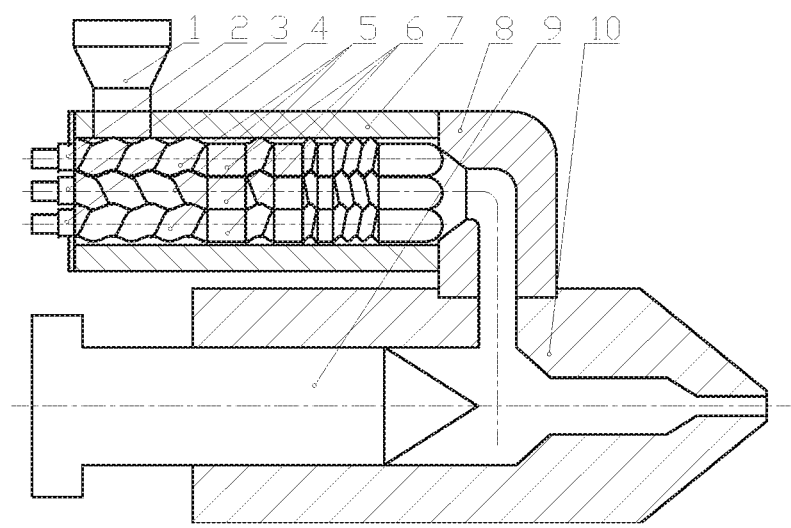
FIG. 7 is a schematic view of the structure of a tri-axial eccentric rotor volume pulsed deformation plasticizing injection device of Example 4.

As shown in FIG. 7, the tri-axial eccentric rotor volume pulsed deformation plasticizing injection device is mainly composed of a tri-axial eccentric rotor volume pulsed deformation plasticizing and conveying unit and a plunger injection unit, wherein the tri-axial eccentric rotor volume pulsed deformation plasticizing and conveying unit is mainly composed of a hopper 1, three rotors (a middle eccentric rotor 3, a right eccentric rotor 2 and a left eccentric rotor 4), a stator 7 and a drive unit, and the plunger injection unit is mainly composed of a connector 8, a plunger 9 and a cylinder 10. The cylinder 10 is connected with the stator 7 through the connector 8, and the plunger 9 is connected with the cylinder 10; the middle eccentric rotor 3, the right eccentric rotor 2 and the left eccentric rotor 4, respectively connected with the drive unit, are all placed in the inner cavity of the stator 7, with the hopper 1 in communication with the inner cavity of the stator; the middle eccentric rotor 3, the right eccentric rotor 2 and the left eccentric rotor 4 are all formed by a spiral structure 5 and a length-varying eccentric cylindrical structure 6 connected alternately, both the pitch of the spiral structure 5 and the length of the eccentric cylinder 6 decreasing along the axial direction; the spiral structure 5 of the middle eccentric rotor 3 and the spiral structures 5 of the right eccentric rotor 2 and the left eccentric rotor 4 are engaged to each other, and the eccentric cylindrical structures 6 of the middle eccentric rotor 3, the right eccentric rotor 2 and the left eccentric rotor 4 are all located in the same axial position; when the middle eccentric rotor 3, the right eccentric rotor 2 and the left eccentric rotor 4 are rotated, the outer surface of the three eccentric rotors 6 and the inner surface of the stator 7 and the top of the spiral rib of the spiral structure 5 form a cavity, whose volume changes periodically along the axial direction and the radial direction of the middle eccentric rotor 3 and the right eccentric rotor 2 and the left eccentric rotor 4 along with the rolling of the eccentric cylinder 6, the materials being plasticized and molten and conveyed into the cylinder 10 through the connector 8 with the plunger 9 constantly moving backward. When the storage amount of the material melt in the cylinder 10 reaches the measured value required by the injection products, the tri-axial eccentric rotor volume pulsed deformation plasticizing and conveying unit stops plasticizing and melting, and the plasticizing measuring process of the injection machine is ended. After the injection machine completes the processes of filling the die and retaining the pressure, the tri-axial eccentric rotor volume pulsed deformation plasticizing and conveying unit begins plasticizing and conveying during the cooling stage of products, with the injection machine starting a new cycle of molding products.

The materials of the present invention undergo cyclical changes in volume in a specific space to complete the plasticizing and conveying process, which is based on domination of the volume pulsed deformation, and has a greatly shortened experienced thermo-mechanical course and reduced plasticizing and conveying energy compared with the traditional screw plasticizing and conveying process based on domination of the shear rheology.

In the present invention the conveying volume of materials formed between two or three engaged eccentric rotors with a special surface structure and an inner surface of a stator changes periodically along the axial direction and the radial direction of the rotors, improving the plasticizing and mixing and mixed dispersion effects of the polymer materials, and having higher adaptability to materials; the plasticizing and conveying process of the materials is continuous with fully positive displacement characteristics, having greatly enhanced extrusion stability and efficiency; the device of the present invention is convenient for disassembly and assembly, as well as for application and promotion.

The present invention can implement extrusion of polymer materials or implement, in combination with a plunger injection unit, injection molding of polymer materials, and have such features as desirable mixing and plasticizing effects for polymer materials, a short thermo-mechanical course, lower power consumption, and wide adaptability.

What is claimed is:

1. A biaxial or tri-axial eccentric rotor volume pulsed deformation plasticizing device comprising a hopper, two or three eccentric rotors, a stator and a drive unit, the eccentric rotors being disposed in an inner cavity of the stator and connected with the drive unit, respectively; the hopper is in communication with the inner cavity of the stator, and the eccentric rotors are all formed by length-varying spiral structures and eccentric cylindrical structures connected alternately; the spiral structures of the eccentric rotors are engaged to each other; and the axial positions of the eccentric cylindrical structures of the two or three rotors are the same; wherein the device is configured to perform a biaxial or tri-axial eccentric rotor volume pulsed deformation plasticizing method, the method comprising the steps of: conveying a volume of materials formed between two or three engaged eccentric rotors formed by spiral structures and eccentric cylindrical structures connected alternately, and an inner surface of the stator, the volume changes periodically along an axial direction and a radial direction of the rotors, thereby achieving the volume pulsed deformation plasticizing and conveying of the materials during engaged rotation of the two or three engaged eccentric rotors; wherein both a pitch of the spiral structure of the eccentric rotor and the length of the eccentric cylinder are gradually decreased in the axial direction.

2. The biaxial or tri-axial eccentric rotor volume pulsed deformation plasticizing device according to claim 1, wherein an axis of the spiral portion of the two or three rotors is the same as the rotation axis of the rotor, and the axis of the eccentric cylinder is eccentric with respect to the rotation axis of the rotor, with the eccentric cylinder in different positions on the same rotor having the same eccentric direction.

3. The biaxial or tri-axial eccentric rotor volume pulsed deformation plasticizing device according to claim 1, wherein the three eccentric rotors comprise, a middle eccentric rotor, a right eccentric rotor and a left eccentric rotor, respectively; the middle eccentric rotor, the right eccentric rotor and the left eccentric rotor are arranged in a horizontal arrangement in the inner cavity of the stator; and the spiral structure of the middle eccentric rotor and the spiral structures of the right eccentric rotor and the left eccentric rotor are engaged to each other.

4. The biaxial or tri-axial eccentric rotor volume pulsed deformation plasticizing device according to claim 1, wherein there are two eccentric rotors, which are a first eccentric rotor and a second eccentric rotor, respectively, both engaged in a same or different direction in the inner cavity of the stator.

5. The biaxial or tri-axial eccentric rotor volume pulsed deformation plasticizing device according to claim 1, wherein the device is mainly composed of a tri-axial eccentric rotor volume pulsed deformation plasticizing and conveying unit and a plunger injection unit, the tri-axial eccentric rotor volume pulsed deformation plasticizing and conveying unit is mainly composed of the hopper, a middle eccentric rotor, a right eccentric rotor, a left eccentric rotor, the stator and a drive unit; the plunger injection unit is mainly composed of a connector, a plunger and a cylinder; the cylinder is connected with the stator through the connector, and the plunger is connected with the cylinder; the middle eccentric rotor, the right eccentric rotor and the left eccentric rotor, respectively connected with the drive unit, are all placed in the inner cavity of the stator; both the pitch of the spiral structure and the length of the eccentric cylinder decrease along the axial direction; and the spiral structure of the middle eccentric rotor and the spiral structures of the right eccentric rotor and the left eccentric rotor are engaged to each other.

6. The biaxial or tri-axial eccentric rotor volume pulsed deformation plasticizing device according to claim 1, wherein both a pitch of the spiral structure of the eccentric rotor and the length of the eccentric cylinder are gradually decreased in the axial direction.

* * * * *